United States Patent
Sharma et al.

(10) Patent No.: US 12,380,135 B2
(45) Date of Patent: Aug. 5, 2025

(54) RECORDS PROCESSING BASED ON RECORD ATTRIBUTE EMBEDDINGS

(71) Applicant: INTERNATIONAL BUSINESS MACHINES CORPORATION, Armonk, NY (US)

(72) Inventors: Devbrat Sharma, Bangalore (IN); Soma Shekar Naganna, Bangalore (IN); Abhishek Seth, Deoband (IN); Neeraj Ramkrishna Singh, Bangalore (IN); Muhammed Abdul Majeed Ameen, Kozhikode (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/337,126

(22) Filed: Jun. 19, 2023

(65) Prior Publication Data

US 2024/0419690 A1    Dec. 19, 2024

(51) Int. Cl.
*G06F 16/28* (2019.01)
*G06F 16/215* (2019.01)

(52) U.S. Cl.
CPC .......... *G06F 16/285* (2019.01); *G06F 16/215* (2019.01)

(58) Field of Classification Search
CPC .............................. G06F 16/285; G06F 16/215
USPC ........................................................ 707/737
See application file for complete search history.

(56) References Cited

U.S. PATENT DOCUMENTS

| | | | |
|---|---|---|---|
| 9,767,127 B2* | 9/2017 | Feldschuh | G06F 16/215 |
| 10,242,019 B1* | 3/2019 | Shan | G06N 7/01 |
| 11,481,448 B2 | 10/2022 | Zhong et al. | |
| 11,755,626 B1* | 9/2023 | Liu | G06F 16/3347 |
| | | | 707/738 |

(Continued)

OTHER PUBLICATIONS

Azzalini, Fabio et al., "Blocking Techniques for Entity Linkage: A Semantics-Based Approach," Data Science and Engineering, Jan. 2021, pp. 6-:20-38.

(Continued)

*Primary Examiner* — Cam Linh T Nguyen

(74) *Attorney, Agent, or Firm* — Eric Chesley, Esq.; Blanche E. Schiller, Esq.; Heslin Rothenberg Farley & Mesiti P.C.

(57) ABSTRACT

One or more trained embedding generation artificial intelligence models are executed to generate a plurality of record attribute embeddings. The plurality of record attribute embeddings represents a plurality of attributes of data of a plurality of records. Grouping of the plurality of record attribute embeddings is performed. The grouping of a record attribute embedding includes grouping attribute values of the record attribute embedding into one or more groups of attribute values. The performing grouping provides a plurality of groups of attribute values for the plurality of record attribute embeddings. Selected records are compared to provide a set of matched records. The comparing, based on a group of attribute values, includes comparing records that include one or more attribute values grouped in the group of attribute values providing a subset of matched records of the set of matched records. The set of matched records is stored in an accessible computer location.

20 Claims, 3 Drawing Sheets

(56) References Cited

U.S. PATENT DOCUMENTS

| | | | |
|---|---|---|---|
| 2010/0312726 A1* | 12/2010 | Thompson | G06N 5/022 |
| | | | 706/54 |
| 2013/0159310 A1* | 6/2013 | Birdwell | G06F 16/3331 |
| | | | 707/758 |
| 2014/0279757 A1 | 9/2014 | Shimanovsky et al. | |
| 2019/0392073 A1* | 12/2019 | Gutierrez Munoz | ................. |
| | | | G06F 16/285 |
| 2020/0089693 A1* | 3/2020 | Fulzele | G06F 16/258 |
| 2023/0040412 A1* | 2/2023 | Ramsl | G06F 8/73 |
| 2024/0153239 A1* | 5/2024 | Chen | G06V 10/761 |

OTHER PUBLICATIONS

Chen, Xiao et al., "The Best of Both Worlds: Combining Hand-Tuned and Word-Embedding-Based Similarity Measures for Entity Resolution," Aug. 2022, pp. 215-224.

Li, Chen et al., "Supporting Efficient Record Linkage for Large Data Sets Using Mapping Techniques," Nov. 23, 2022, pp. 1-25.

\* cited by examiner

RECORDS PROCESSING BASED ON RECORD ATTRIBUTE EMBEDDINGS

BACKGROUND

One or more aspects relate, in general, to facilitating processing within a computing environment, and in particular, to facilitating the processing of data within the computing environment.

Certain aspects relating to the processing of data include matching data records. For instance, to match a pair of records, extensive comparison of different record attributes, such as name, address, date of birth, identifier, is performed. Due to an exponential number of comparisons to compare each record to one another, a bucketing-based candidate selection technique is used.

The bucketing-based candidate selection technique is based on equality of a hash value of features of the records. The hash-based bucketing technique enables the comparison of similar records while reducing the total number of comparisons. With a hash-based candidate selection, a record is included in the bucket if an attribute value of the record produces the exact same hash value.

SUMMARY

Shortcomings of the prior art are overcome, and additional advantages are provided through the provision of a computer-implemented method of facilitating processing within a computing environment. The computer-implemented method includes obtaining, by at least one computing device of the computing environment, data of a plurality of records. The at least one computing device of the computing environment executes one or more trained embedding generation artificial intelligence models to generate a plurality of record attribute embeddings based on the data. The plurality of record attribute embeddings represents a plurality of attributes of the data. Grouping is performed, using the at least one computing device of the computing environment, of the plurality of record attribute embeddings. The performing grouping of a record attribute embedding of the plurality of record attribute embeddings includes grouping attribute values of the record attribute embedding into one or more groups of attribute values based on one or more selected criteria. The performing grouping provides a plurality of groups of attribute values for the plurality of record attribute embeddings. Using the at least one computing device of the computing environment and based on the plurality of groups of attribute values, selected records of the plurality of records are compared to provide a set of matched records. The comparing, based on a group of attribute values of the plurality of groups of attribute values, includes comparing records that include one or more attribute values grouped in the group of attribute values providing a subset of matched records of the set of matched records. Using the at least one computing device of the computing environment, the set of matched records is stored in a computer location accessible by one or more users of the set of matched records.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
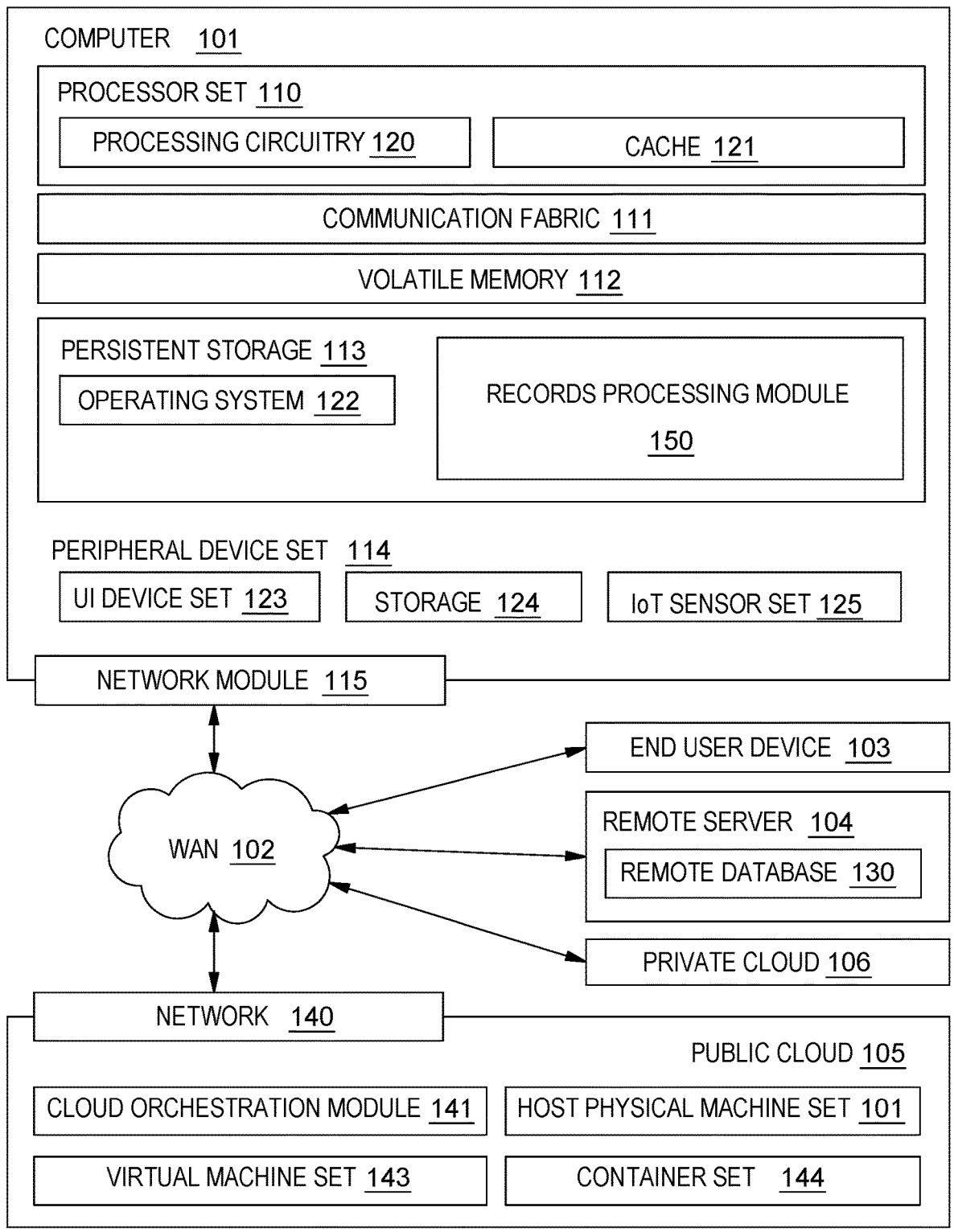
FIG. 1 depicts one example of a computing environment to perform, include and/or use one or more aspects of the present disclosure.

In one or more aspects, a capability is provided to facilitate processing within a computing environment. In one or more aspects, a capability is provided to facilitate data processing in which data accessibility is improved and storage (e.g., memory, storage, and/or a combination of memory/storage) requirements are reduced. Processing within the computing environment is enhanced by improving the processing of data records, including, but not limited to, candidate selection of records to be compared, such that the processing is streamlined, storage requirements are reduced, and memory access is improved.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs records processing and/or performs one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as records processing code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

In one example, to process data records, a records processing module (e.g., records processing module 150) is used, in accordance with one or more aspects of the present disclosure. A records processing module (e.g., records processing module 150) includes code or instructions used to process records, including performing candidate selection of records to be compared, in accordance with one or more aspects of the present disclosure. A records processing module (e.g., records processing module 150) includes, in one example, various sub-modules to be used to perform the records processing. The sub-modules are, e.g., computer readable program code (e.g., instructions) in computer readable media, e.g., storage (persistent storage 113, storage 124, cache 121, other storage, as examples). The computer readable media may be part of a computer program product and the computer readable program code may be executed by and/or using one or more computing devices (e.g., one or more computers, such as computer(s) 101; one or more end user devices, such as end user device(s) 103; one or more servers, such as server(s) 104; one or more processors, such as processor(s) of processor set 110; processing circuitry, such as processing circuitry of processor set 110; and/or other computing devices, etc.). Additional and/or other computers, servers, devices, processors, processing circuitry and/or other computing devices may be used to execute one or more of the sub-modules and/or portions thereof. Many examples are possible.

Figure 2:
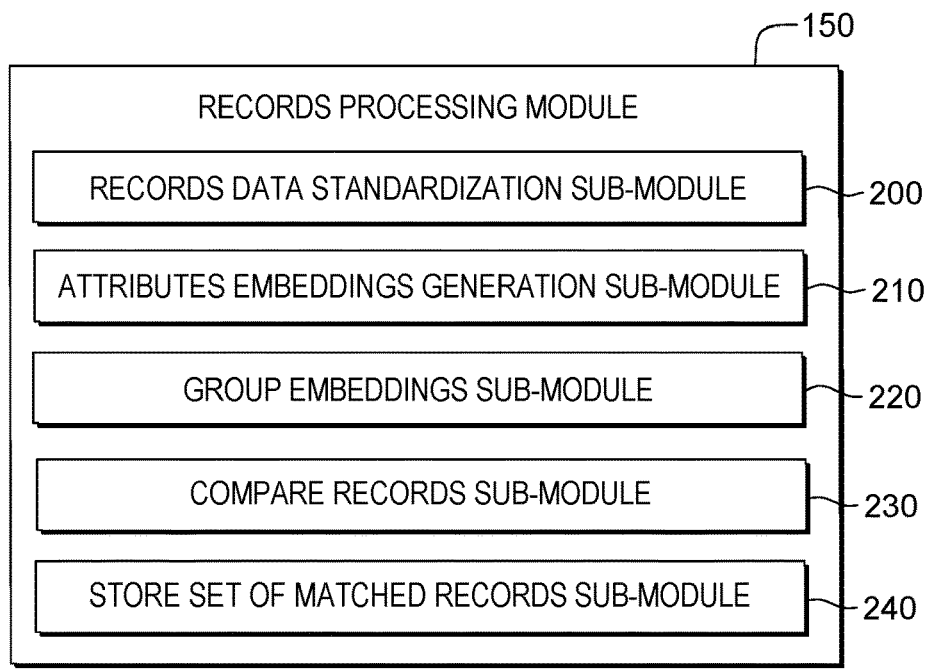
FIG. 2 depicts one example of sub-modules of a records processing module of FIG. 1, in accordance with one or more aspects of the present disclosure.

One example of records processing module 150 is described with reference to FIG. 2. In one example, records processing module 150 includes a records data standardization sub-module 200 used to standardize data of the records to be processed; an attributes embedding generation sub-module 210 used to generate attributes embeddings of the data (e.g., standardized data); a group embeddings sub-module 220 to cluster attribute values of each of the embeddings into one or more groups based on, e.g., similarity of the attribute values, as defined by one or more selected criteria (e.g., a cosine similarity or other similarity-identifying technique); a compare records sub-module 230 to compare records based on the groups provided by group embeddings sub-module 220; and a store set of matched records sub-module 240 to store the set of matched records in a computer location (e.g., memory, storage, etc.) for access by one or more users of the records. Although various sub-modules are described, a records processing module, such as records processing module 150, may include additional, fewer and/or different sub-modules. A particular sub-module may include additional code, including code of other sub-modules, less code, and/or different code. Further, additional and/or other modules may be used to process records. Many variations are possible.

The sub-modules are used, in accordance with one or more aspects of the present disclosure, to perform records processing, as further described with reference to FIG. 3. In one example, a records processing process 300 is executed by one or more computing devices (e.g., one or more computers (e.g., computer 101, other computer(s), etc.), one or more end user devices (e.g., end user device 103, other device(s)), one or more servers (e.g., server 104, other server(s)), one or more processors and/or processing circuitry (e.g., of processor set 110 or other processor sets), and/or one or more other computing devices, etc.). Although example computing devices, computers, servers, devices, processors and/or processing circuitry are provided, additional, fewer and/or other computers, servers, devices, processors, processing circuitry and/or computing devices may be used for the records processing process. Various options are possible.

Figure 3:
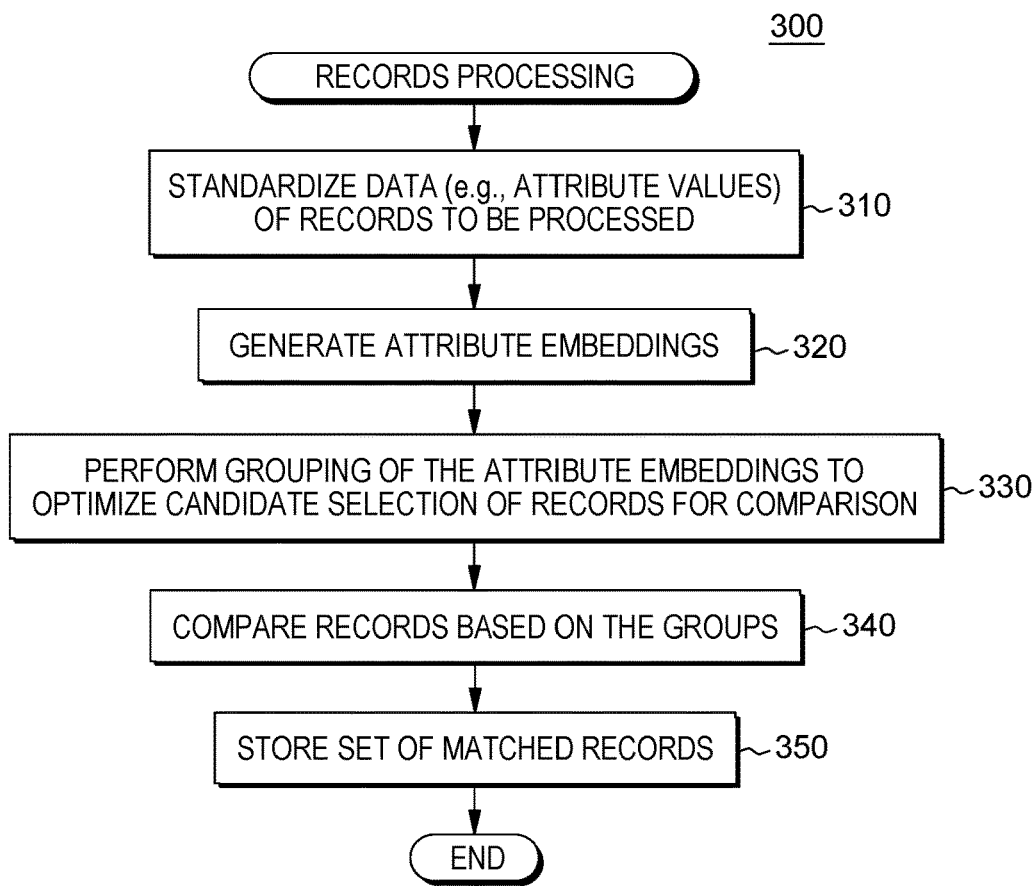
FIG. 3 depicts one example of records processing, in accordance with one or more aspects of the present disclosure.

Referring to FIG. 3, in one example, a records processing process 300 performs 310 a standardization process to standardize data of a plurality of records to be processed, providing standardized data. For instance, a record may include one or more attributes of the data, such as name, address, date of birth, identifier, other attributes, a combination of one or more attributes, etc., and values of those attributes are standardized. This includes, for instance, using a standard transformation that, as examples, standardizes alphabetic characters, removes punctuation, checks for anonymous values and may ignore or eliminate those, standardizes words or phrases, etc. As an example, if one record has an address attribute and the value of the address attribute has a street name that includes "Street" and another record has a street name that includes "St.", then the standardizing technique would standardize them to the same value, such as "Street" or another standardizing value. Other examples and variations are possible. The data (e.g., attribute values) to be standardized may be all of the data of the plurality of records or selected data of the plurality of records. The data selected to be standardized is, in one example, the one or more attributes of the data to be used in further processing herein. Other examples are also possible.

Using the standardized data (e.g., standardized attribute values), process 300 generates 320 attribute embeddings. For example, process 300 uses one or more trained embedding generation artificial intelligence models to generate a plurality of record attribute embeddings based on the standardized data. The plurality of record attribute embeddings represents attributes of the data of the plurality of records. For instance, if one or more of the records being processed includes attributes of name, address, date of birth, identifier, as examples (additional, fewer and/or other attributes may be included within one or more of the records being processed), then process 300 may execute the one or more trained embedding generation artificial intelligence models to generate a record attributes embedding for name, another for address, another for date of birth, and yet another for identifier, etc. Additional, fewer and/or other record attribute embeddings may be generated for the record attributes using the one or more trained embedding generation artificial intelligence models.

In one example, each record attribute embedding is output as a multi-dimensional vector that represents the attributes with their context. In one example, the embedding generation models are used to generate the attribute embeddings in a Euclidean space—a finite-dimensional inner product space over real numbers—(e.g., a very high dimensional Euclidean space).

In one or more aspects, initially, the embedding generation model(s) used to generate the embeddings are trained with data other than the data being processed herein. For instance, they are trained with natural language models and processing that uses generic data (i.e., data that is not necessarily of the records being processed). However, in one or more aspects, the embedding generation model(s) used may be further trained using selected data of the data being processed to enhance the models and increase accuracy of the output of the models. This further training may be performed at selected times, such as at defined intervals, repeatedly, etc. In each iteration, the model learns based on the new training input. One or more variations are possible.

Based on the multi-dimensional embeddings of record attribute values, process 300 performs grouping 330 of the attribute embeddings to optimize candidate selection of records for comparison. In one example, the grouping is performed for each record attribute embedding providing one or more groups of attribute values for each record attribute embedding. The grouping of a record attribute embedding into one or more groups of attribute values is based on one or more selected criteria (e.g., similarity of attributes as defined by one or more criteria, such as a cosine similarity or other techniques used to determine similarity). Each group of attribute values for a record attribute embedding includes attribute values of one or more records of the plurality of records being processed. For instance, if a record attribute embedding is for the attribute referred to as address, and a group of attribute values for the record attribute embedding includes an address value of Street A, then one or more records of the plurality of records include that attribute value and correspond to that group of attribute values.

In one example, process 300 uses an unsupervised clustering technique to perform the grouping for each of the record attribute embeddings. The unsupervised clustering technique clusters a record attribute embedding into one or more groups based on similarity, producing groups (also referred to as buckets or clusters) that represent records based on attribute value similarities. In one or more examples, the one or more selected criteria is a cosine similarity criterion. Using, for instance, cosine similarity, each attribute value of the record attribute embedding (which in one example is represented as a multi-dimensional vector) is placed in a group. For instance, the cosine angle between two vectors is determined and that value is compared to a selected threshold. If the value is 1 or close to one (e.g., within a selected range, such as 0.7-1.0, or other selected ranges), then the attribute value is placed in a group of similar attribute values. Other examples and/or techniques are possible.

Each group, in one example, is treated as one bucket or cluster of attributes used to provide candidate records for comparison. For instance, process 300 compares 340 the records corresponding to a group to determine if there are any matches. For instance, process 300 performs pairwise comparison of records identified from the group. If they are a match, as defined by a selected threshold (e.g., above a threshold, below a threshold, within a range of the threshold, etc.), the pair is considered a match and placed in a subset of matched records, which may also be referred to as an entity.

In one example, a plurality of subsets of matched records is determined based on the groups defined for the plurality of record attribute embeddings. The plurality of subsets of matched records are consolidated, in one example, into a set of matched records. Process 300 stores 350 the set of matched records in a computer location (e.g., storage, memory) accessible to one or more users of the records. A record of the matched set of records may represent one or more other records that are different but found to be similar based on one or more selected criteria.

In one example, a user may perform a search of the stored set of matched records to obtain information to be used in many technical or technological areas, including, but not limited to, computer processing, manufacturing and/or other industries providing products and/or services. The user may, for instance, search the stored set of matched records to obtain parts information on one or more parts to be used in building or upgrading a computer or in manufacturing a component, as examples. Many uses are possible.

In one example, the searching is performed automatically using one or more computing devices and the obtained information or data may be used in a process (e.g., an automatic process) to build, upgrade and/or manufacture, as just some examples. Again, many possibilities exist. One or more of the improvements in record processing provided in accordance with one or more aspects of the present disclosure provides improvements in one or more technical or technological areas, including, but not limited to, those provided herein.

In one or more aspects, records are grouped based on the similarity of attribute values which enhances the quality of candidate selection for the comparison of records, achieving an optimized candidate selection. In one or more aspects, records data are standardized using standardizing transformations. Embedding generation models are utilized to generate attribute embeddings in, e.g., a very high dimensional Euclidean space. In one aspect, the embeddings are, e.g., multi-dimensional vectors that represent the attributes with their context. In one aspect, an unsupervised clustering technique is used to group these multi-dimensional embeddings into groups based on similarity, producing buckets that contain records based on attribute value similarities. Each cluster is treated as one bucket and is used for the candidate selection of records for comparison.

As described herein, in one or more aspects, computer processing is improved by grouping records based on similarity of attribute values, which enhances the quality of candidate selection for the comparison of records, achieving optimized candidate selection for comparison. In one or more aspects, data storage and access within a computing environment are enhanced by receiving data from multiple sources, processing the data received from the multiple sources to provide a matched set of records and storing the matched set of records in a computer location accessible to one or more users. The matched set of records is accessible to the one or more users via, e.g., one or more computer networks facilitating access/use of the data.

In one or more aspects, use of storage is reduced by generating the matched set of records that consolidates multiple similar but different records into one record, eliminating the need to store the similar but different records in the matched set of records. Processing within the computer environment is improved by reducing the number of records that are to be searched when looking for a particular record. For instance, processing time in searching, storing, maintaining and/or updating the matched set of records is improved. Thus, the functioning of a computer is improved, in one or more aspects, by, for instance, reducing the amount of storage needed to store the matched set of records since multiple records are consolidated into one record, and reducing processing time in searching and accessing the records since the multiple records are consolidated.

Described above is one example of records processing. One or more aspects of the process may use machine learning. For instance, machine learning may be used to learn of data access, data usage (e.g., access frequencies, access patterns), data similarities, query patterns, search terms distribution, to predict access usage, to predict query patterns, perform analysis and/or perform other tasks. A system is trained to perform analyses and learn from input data and/or choices made.

Figure 4:
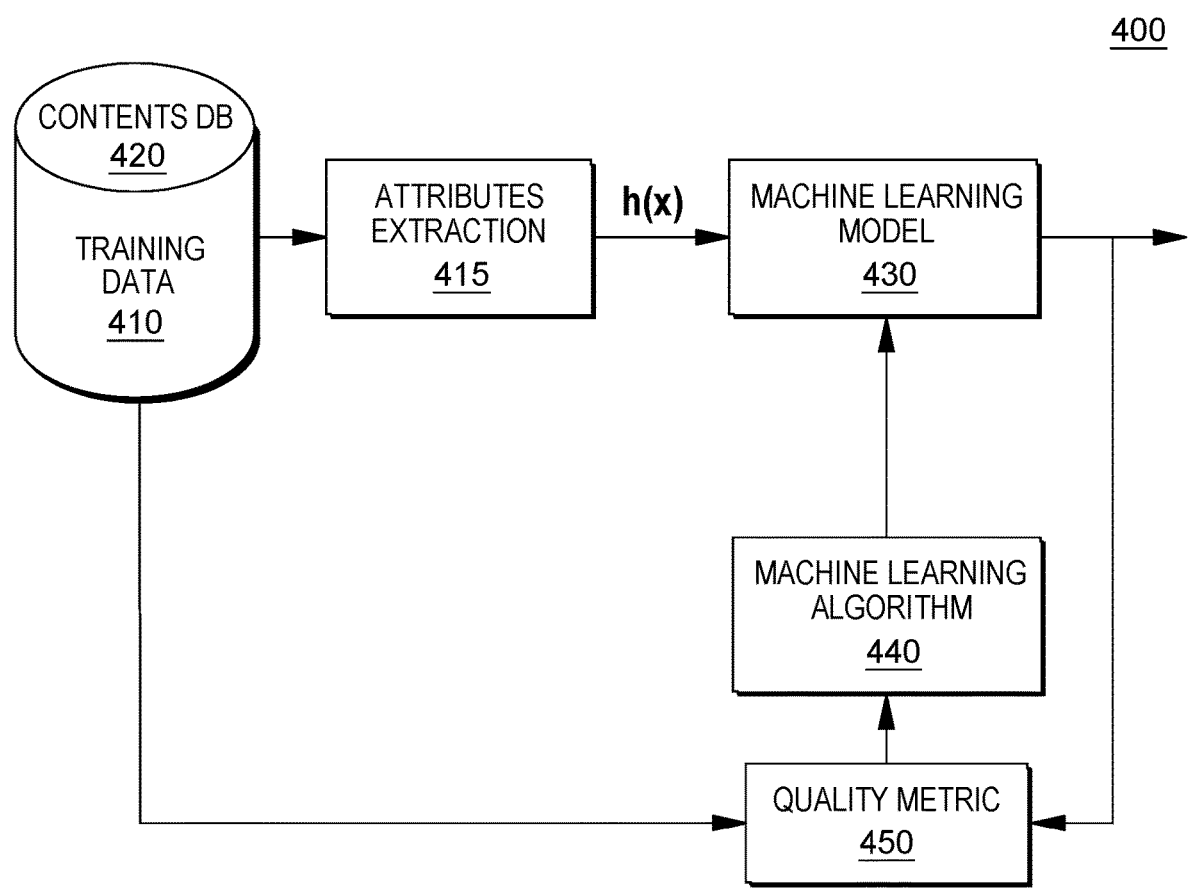
FIG. 4 depicts one example of a machine learning training system used in accordance with one or more aspects of the present disclosure.

FIG. 4 is one example of a machine learning training system 400 that may be utilized, in one or more aspects, to perform cognitive analyses of various inputs, including input data, data from one or more data structures and/or other data. Training data utilized to train the model in one or more embodiments of the present disclosure includes, for instance, data that pertains to one or more events, such as natural language processing data, record data being processed, etc. The program code in embodiments of the present disclosure performs a cognitive analysis to generate one or more training data structures, including algorithms utilized by the program code to predict states of a given event. Machine learning (ML) solves problems that are not solved with numerical means alone. In this ML-based example, program code extracts various attributes from ML training data 410 (e.g., historical attribute data collected from various data sources relevant to the event), which may be resident in one or more databases 420 comprising event or task-related data and general data. Attributes 415 are utilized to develop a predictor function, h(x), also referred to as a hypothesis, which the program code utilizes as a machine learning model 430.

In identifying various event states, features, attribute similarities, constraints and/or behaviors indicative of states in the ML training data 410, the program code can utilize various techniques to identify attributes in an embodiment of the present disclosure. Embodiments of the present disclosure utilize varying techniques to select attributes (data attributes, elements, patterns, features, constraints, distribution, etc.), including but not limited to, diffusion mapping, principal component analysis, recursive feature elimination (a brute force approach to selecting attributes), and/or a Random Forest, to select the attributes related to various events. The program code may utilize a machine learning algorithm 440 to train the machine learning model 430 (e.g., the algorithms utilized by the program code), including providing weights for the conclusions, so that the program code can train the predictor functions that comprise the machine learning model 430. The conclusions may be evaluated by a quality metric 450. By selecting a diverse set of ML training data 410, the program code trains the machine learning model 430 to identify and weight various attributes (e.g., data attributes, features, patterns, constraints, distributions, etc.) that correlate to various states of an event.

The model generated by the program code is self-learning as the program code updates the model based on active event feedback, as well as from the feedback received from data related to the event. For example, when the program code determines that there is a constraint, event, similarity or pattern (e.g., data attribute, record attribute similarity, query pattern, data distribution, search terms distribution, etc.) that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent (now known or later developed) to tune the model, based on data obtained from one or more data sources. In one or more embodiments, the program code interfaces with application programming interfaces to perform a cognitive analysis of obtained data. Specifically, in one or more embodiments, certain application programming interfaces comprise a cognitive agent (e.g., learning agent) that includes one or more programs, including, but not limited to, natural language classifiers, a retrieve and rank service that can surface the most relevant information from a collection of documents, concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. An application programming interface can also provide audio related application programming interface services, in the event that the collected data includes audio, which can be utilized by the program code, including but not limited to natural language processing, text to speech capabilities, and/or translation.

In one or more embodiments, the program code utilizes a neural network to analyze event-related data to generate the model utilized to predict the state of a given event at a given time. Neural networks are a biologically-inspired programming paradigm which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (or similarities) in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

One or more aspects of the present disclosure are tied to computer technology and facilitate processing within a computer, improving performance thereof. For instance, storage requirements and costs are reduced, along with processing time and resources to use the matched set of records. Response time for queries may be improved. Processing within a processor, computer system and/or computing environment is improved.

One or more aspects optimize records processing by enhancing the candidate selection process in which records are grouped together that have similar attribute values and not just the exact same values. This increases the number of records to be compared and further reduces the number of records to be accessed or searched after the comparing process is complete, since the matched set of records consolidates more records than comparisons based on other techniques, such as hash-value based candidate selection.

Other aspects, variations and/or embodiments are possible.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to perform records processing and/or to perform one or more other aspects of the present disclosure.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. Other types of embedding generation models and/or clustering techniques may be used. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

obtaining, by at least one computing device of the computing environment, data of a plurality of records;

executing, by the at least one computing device of the computing environment, one or more trained embedding generation artificial intelligence models to generate a plurality of record attribute embeddings based on the data, the plurality of record attribute embeddings representing a plurality of attributes of the data, wherein a record attribute embedding corresponds to an attribute of the data and is output as a multi-dimensional vector that represents one or more attributes within its context;

performing grouping, using the at least one computing device of the computing environment, of the plurality of record attribute embeddings to optimize candidate selection of records for pairwise comparison of records to find matches among pairs of records, wherein the performing grouping of the record attribute embedding of the plurality of record attribute embeddings includes grouping attribute values of the record attribute embedding into one or more groups of attribute values based on one or more selected criteria, and wherein the performing grouping provides a plurality of groups of attribute values for the plurality of record attribute embeddings;

comparing, using the at least one computing device of the computing environment and based on the plurality of groups of attribute values, selected records of the plurality of records to provide a set of matched records created from a plurality of subsets of matched records generated from the comparing, wherein the comparing, based on a group of attribute values of the plurality of groups of attribute values, generates a subset of matched records of the plurality of subsets of matched records of the set of matched records, the comparing based on the group of attribute values comprising:
  performing a pairwise comparison of a pair of records that includes one or more attribute values of the group of attribute values,
  determining, for the pair of records, whether the pairwise comparison has a predefined relationship with a threshold; and
  selecting the pair of records for the subset of matched records based on the pairwise comparison having the predefined relationship with the threshold; and
storing, using the at least one computing device of the computing environment, the set of matched records in a computer location accessible by one or more users of the set of matched records, and wherein a record of the set of matched records represents one or more other records that are different but found to be similar based on one or more defined criteria.

2. The computer-implemented method of claim 1, wherein the executing outputs the plurality of record attribute embeddings as a plurality of multi-dimensional vectors, and wherein the performing grouping of the plurality of record attribute embeddings uses an unsupervised clustering technique.

3. The computer-implemented method of claim 1, wherein the one or more selected criteria includes a cosine similarity.

4. The computer-implemented method of claim 1, wherein the one or more trained embedding generation artificial intelligence models are trained using natural language models and processing.

5. The computer-implemented method of claim 1, further comprising performing further training of the one or more trained embedding generation artificial intelligence models using selected data of the plurality of records.

6. The computer-implemented method of claim 1, further comprising standardizing the data of the plurality of records to provide standardized data, and wherein the data in the executing the one or more trained embedding generation artificial intelligence models to generate the plurality of record attribute embeddings based on the data is the standardized data.

7. The computer-implemented method of claim 1, wherein the plurality of attribute embeddings are generated in a finite-dimensional inner product space over real numbers.

8. The computer implemented method of claim 1, wherein the comparing based on the group of attribute values further comprises repeating the performing the pairwise comparison, the determining whether the pairwise comparison has the predefined relationship and the selecting the pair of records for one or more additional pairs of records that includes the one or more attribute values of the group of attribute values.

9. The computer-implemented method of claim 1, further comprising performing the comparing for each group of attribute values of the plurality of groups of attribute values to generate the plurality of subsets of matched records.

10. The computer-implemented method of claim 9, further comprising:
  consolidating the plurality of subsets of matched records to provide the set of matched records, the set of matched records including fewer records than the plurality of records; and
  wherein the storing the set of matched records in the computer location accessible by the one or more users includes storing the set of matched records in storage, wherein an amount of storage used for the set of matched records is less than the amount of storage used for the plurality of records.

11. A computer system for facilitating processing within a computing environment, the computer system comprising:
  a memory; and
  one or more computing devices in communication with the memory, wherein the computer system is configured to perform a method, said method comprising:
    obtaining data of a plurality of records;
    executing one or more trained embedding generation artificial intelligence models to generate a plurality of record attribute embeddings based on the data, the plurality of record attribute embeddings representing a plurality of attributes of the data, wherein a record attribute embedding corresponds to an attribute of the data and is output as a multi-dimensional vector that represents one or more attributes within its context;
    performing grouping of the plurality of record attribute embeddings to optimize candidate selection of records for pairwise comparison of records to find matches among pairs of records, wherein the performing grouping of the record attribute embedding of the plurality of record attribute embeddings includes grouping attribute values of the record attribute embedding into one or more groups of attribute values based on one or more selected criteria, and wherein the performing grouping provides a plurality of groups of attribute values for the plurality of record attribute embeddings;
    comparing, based on the plurality of groups of attribute values, selected records of the plurality of records to provide a set of matched records created from a plurality of subsets of matched records generated from the comparing, wherein the comparing, based on a group of attribute values of the plurality of groups of attribute values, generates a subset of matched records of the plurality of subsets of matched records of the set of matched records, the comparing based on the group of attribute values comprising:
      performing a pairwise comparison of a pair of records that includes one or more attribute values of the group of attribute values,
      determining, for the pair of records, whether the pairwise comparison has a predefined relationship with a threshold; and
      selecting the pair of records for the subset of matched records based on the pairwise comparison having the predefined relationship with the threshold; and
    storing the set of matched records in a computer location accessible by one or more users of the set of matched records, and wherein a record of the set of matched records represents one or more other records that are different but found to be similar based on one or more defined criteria.

12. The computer system of claim 11, wherein the method further comprises standardizing the data of the plurality of records to provide standardized data, and wherein the data in the executing the one or more trained embedding generation artificial intelligence models to generate the plurality of record attribute embeddings based on the data is the standardized data.

13. The computer system of claim 11, wherein the plurality of attribute embeddings are generated in a finite-dimensional inner product space over real numbers.

14. The computer system of claim 11, wherein the method further comprises performing the comparing for each group of attribute values of the plurality of groups of attribute values to generate the plurality of subsets of matched records.

15. The computer system of claim 14, wherein the method further comprises:
consolidating the plurality of subsets of matched records to provide the set of matched records, the set of matched records including fewer records than the plurality of records; and
wherein the storing the set of matched records in the computer location accessible by the one or more users includes storing the set of matched records in storage, wherein an amount of storage used for the set of matched records is less than the amount of storage used for the plurality of records.

16. A computer program product for facilitating processing within a computing environment, said computer program product comprising:
one or more computer readable storage media and program instructions collectively stored on the one or more computer readable storage media readable by at least one processing circuit to:
obtain data of a plurality of records;
execute one or more trained embedding generation artificial intelligence models to generate a plurality of record attribute embeddings based on the data, the plurality of record attribute embeddings representing a plurality of attributes of the data, wherein a record attribute embedding corresponds to an attribute of the data and is output as a multi-dimensional vector that represents one or more attributes within its context;
perform grouping of the plurality of record attribute embeddings to optimize candidate selection of records for pairwise comparison of records to find matches among pairs of records, wherein the performing grouping of the record attribute embedding of the plurality of record attribute embeddings includes grouping attribute values of the record attribute embedding into one or more groups of attribute values based on one or more selected criteria, and wherein the performing grouping provides a plurality of groups of attribute values for the plurality of record attribute embeddings;
compare, based on the plurality of groups of attribute values, selected records of the plurality of records to provide a set of matched records created from a plurality of subsets of matched records generated from the compare, wherein the compare, based on a group of attribute values of the plurality of groups of attribute values, generates a subset of matched records of the plurality of subsets of matched records of the set of matched records, the compare based on the group of attribute values comprising:
performing a pairwise comparison of a pair of records that includes one or more attribute values of the group of attribute values;
determining, for the pair of records, whether the pairwise comparison has a predefined relationship with a threshold; and
selecting the pair of records for the subset of matched records based on the pairwise comparison having the predefined relationship with the threshold; and
store the set of matched records in a computer location accessible by one or more users of the set of matched records, and wherein a record of the set of matched records represents one or more other records that are different but found to be similar based on one or more defined criteria.

17. The computer program product of claim 16, wherein the program instructions are further readable by the at least one processing circuit to standardize the data of the plurality of records to provide standardized data, and wherein the data in the executing the one or more trained embedding generation artificial intelligence models to generate the plurality of record attribute embeddings based on the data is the standardized data.

18. The computer program product of claim 16, wherein the plurality of attribute embeddings generated in a finite-dimensional inner product space over real numbers.

19. The computer program product of claim 16, wherein the program instructions are further readable by the at least one processing circuit to perform the comparing for each group of attribute values of the plurality of groups of attribute values to generate the plurality of subsets of matched records.

20. The computer program product of claim 19, wherein the program instructions are further readable by the at least one processing circuit to:
consolidate the plurality of subsets of matched records to provide the set of matched records, the set of matched records including fewer records than the plurality of records; and
wherein the storing the set of matched records in the computer location accessible by the one or more users includes storing the set of matched records in storage, wherein an amount of storage used for the set of matched records is less than the amount of storage used for the plurality of records.

* * * * *